(12) United States Patent
Storck et al.

(10) Patent No.: US 6,443,608 B1
(45) Date of Patent: Sep. 3, 2002

(54) INTEGRATED LAMP AND FASCIA SYSTEM

(75) Inventors: Alan G Storck, Wixom; Drew D Mosser, Farmington Hills; Ross J Parpart, Troy, all of MI (US)

(73) Assignee: General Motors Corporation, Detroit, MI (US)

( * ) Notice: Subject to any disclaimer, the term of this patent is extended or adjusted under 35 U.S.C. 154(b) by 5 days.

(21) Appl. No.: 09/735,579

(22) Filed: Dec. 14, 2000

(51) Int. Cl.[7] .............................................. F21V 19/02
(52) U.S. Cl. ........................ 362/523; 362/289; 362/428
(58) Field of Search ................................ 362/288, 369, 362/390, 285, 287, 289, 427, 428, 430, 505, 523, 549, 512

(56) References Cited

U.S. PATENT DOCUMENTS

| | | | | |
|---|---|---|---|---|
| 4,722,032 A | * | 1/1988 | Kulka | 362/287 |
| 4,899,262 A | * | 2/1990 | Hammond et al. | 362/432 |
| 4,955,577 A | | 9/1990 | Ching | 248/539 |
| 5,331,519 A | * | 7/1994 | Fujino | 362/289 |

* cited by examiner

*Primary Examiner*—Y. My Quach-Lee
(74) *Attorney, Agent, or Firm*—Laura C. Hargitt

(57) ABSTRACT

An integrated lamp and fascia system for a vehicle comprises a lamp having a lamp housing. A vehicle fascia includes a fascia pocket defined by two side walls, a bottom wall, and a rear wall, in which the lamp housing is disposed. The rear wall has a fixed portion, a flanged portion, and a cross car hinge seam about which the flanged portion flexes. The lamp housing is mounted to the flanged portion. An adjustment means includes an adjustment clip mounted to the fixed portion of the rear wall to provide a vertical extension thereto, and an adjustment screw accessible from a forward surface of the lamp housing and extending through an upper region of the lamp housing and through the adjustment clip. Turning the screw either moves the upper region of the lamp housing closer to or further from the pocket rear wall by rotating the lamp housing about the hinge seam to adjust vertical aim of the lamp.

6 Claims, 4 Drawing Sheets

INTEGRATED LAMP AND FASCIA SYSTEM

TECHNICAL FIELD

The present invention relates to an integrated lamp and fascia system for a vehicle.

BACKGROUND OF THE INVENTION

Head lamps are required equipment on motor vehicles. Often vehicles are also equipped with fog lamps to provide additional lighting while driving in inclement weather or simply as a styling feature. Some states mandate that forward-projecting lamps are capable of being adjusted for tuning vertical aim of the light beam. To meet this adjustment requirement, lamps typically include complex bracketry and fasteners for securing to the vehicle bumper or fascia. Often the attachment brackets are cantilevered, which may lead to dynamic shake and stability concerns. Further such bracketry consumes much packaging space in an area of the vehicle that is generally packaging constrained.

SUMMARY OF THE INVENTION

The present invention is directed to an integrated lamp and fascia system, which includes a lamp housing secured within a pocket of the fascia. The fascia pocket is defined by two side walls, a bottom wall, and a rear wall. The rear wall has a fixed portion, a flanged portion, and a cross car hinge seam about which the flanged portion flexes. The lamp housing is mounted to the flanged portion. An adjustment means is provided for altering the vertical aim of the lamp. It includes an adjustment clip, mounted to the fixed portion of the rear wall to provide a vertical extension thereto, and an adjustment screw, accessible from a forward surface of the lamp housing and extending through the lamp housing and the adjustment clip. Turning the screw either moves the upper region of the lamp housing closer to or further from the pocket rear wall by rotating the lamp housing about the hinge seam to adjust vertical aim of the lamp.

This system provides the capability to adjust the vertical aiming of the light beams while eliminating bracketry and fasteners commonly used for this purpose. The system also provides a more robust attachment scheme thereby minimizing dynamic shake and stability concerns.

DESCRIPTION OF THE PREFERRED EMBODIMENT

Figure 1:
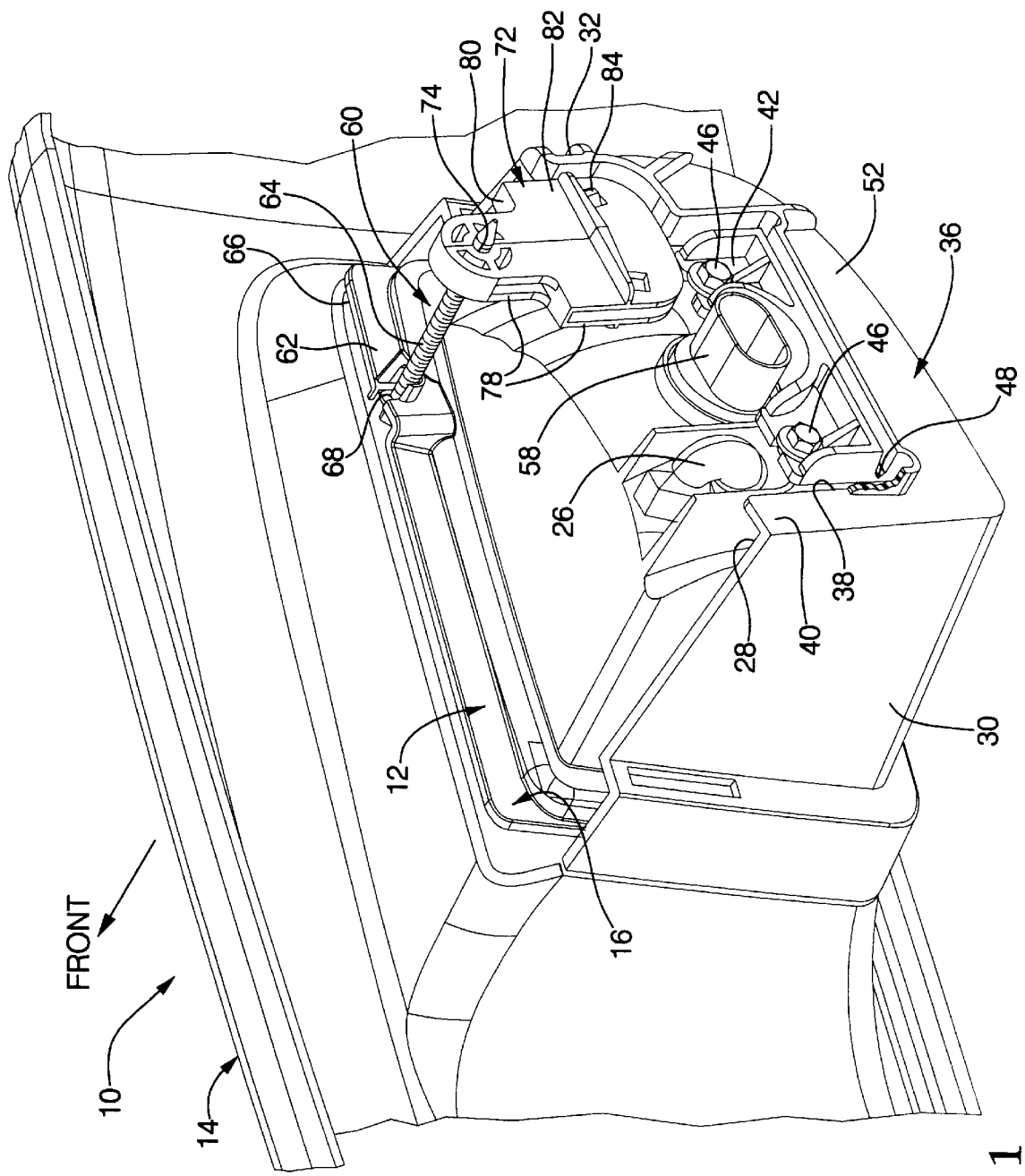
FIG. 1 is a schematic, rear isometric view of the integrated lamp and fascia system of the present invention.

The present invention is for an integrated lamp and fascia system designated generally as 10 in FIG. 1. The integrated lamp and fascia system 10 includes a lamp 12 secured to a fascia 14 of a vehicle. The lamp 12 may be any vehicle lamp requiring vertical aim adjustment, but may have particular applicability to a fog lamp and is therefore described as such. The fascia 14 may be a front fascia in the front of the vehicle, as illustrated, or a rear fascia in the rear of the vehicle. For the description, the forward or fore direction is towards the front of the vehicle.

Figure 3:
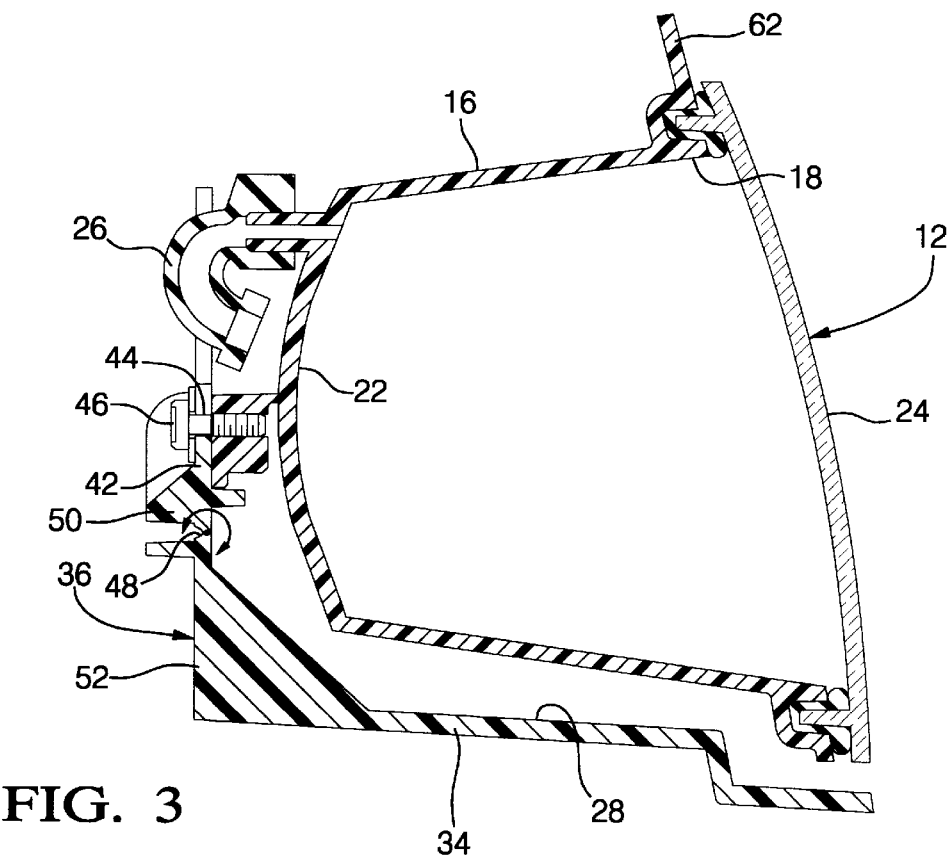
FIG. 3 is a sectional side view through line 3—3 of FIG. 2.
Figure 4:
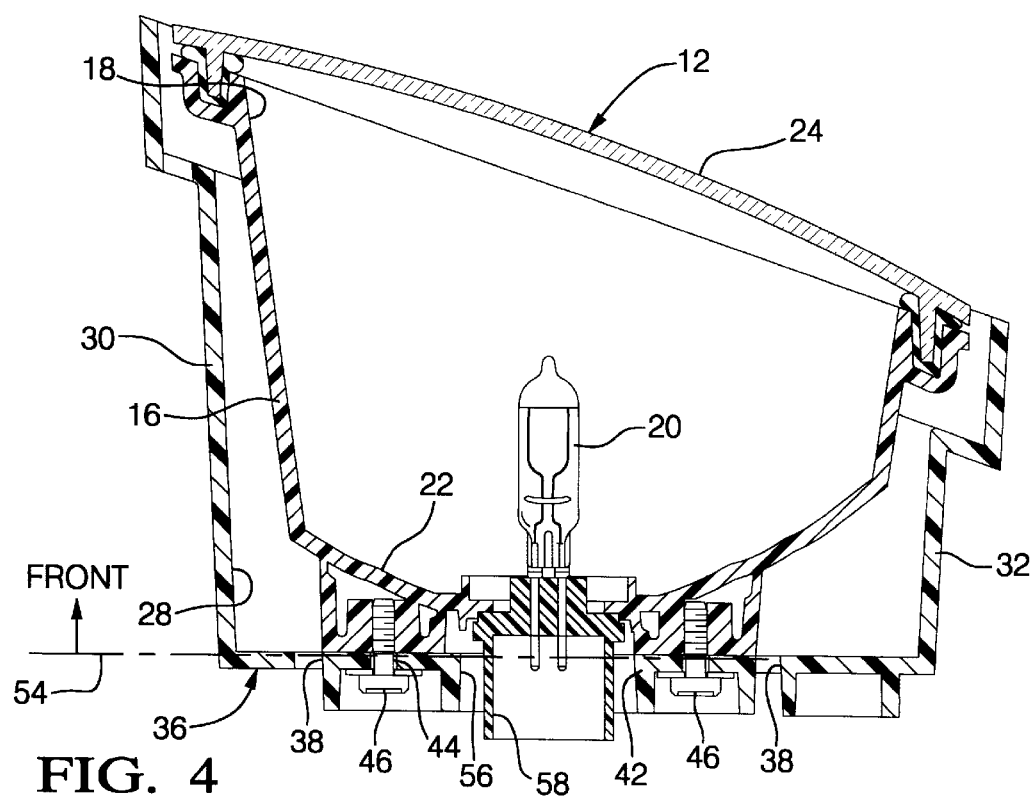
FIG. 4 is a sectional plan view through line 4—4 of FIG. 2.

Referring to FIGS. 3 and 4, the fog lamp 12 is comprised of a housing 16 having an open end 18, typically round or rectangular, into which an illuminating source 20 and reflecting surface 22 are provided. A lens 24 is bonded to and covers the open end 18 of the housing. The fog lamp 12 may operate to illuminate the ground and region in front of the vehicle during inclement weather. The lamp housing 16 may also include a rear vent 26 through which water vapor may escape to minimize water condensation within the fog lamp 12.

Figure 2:
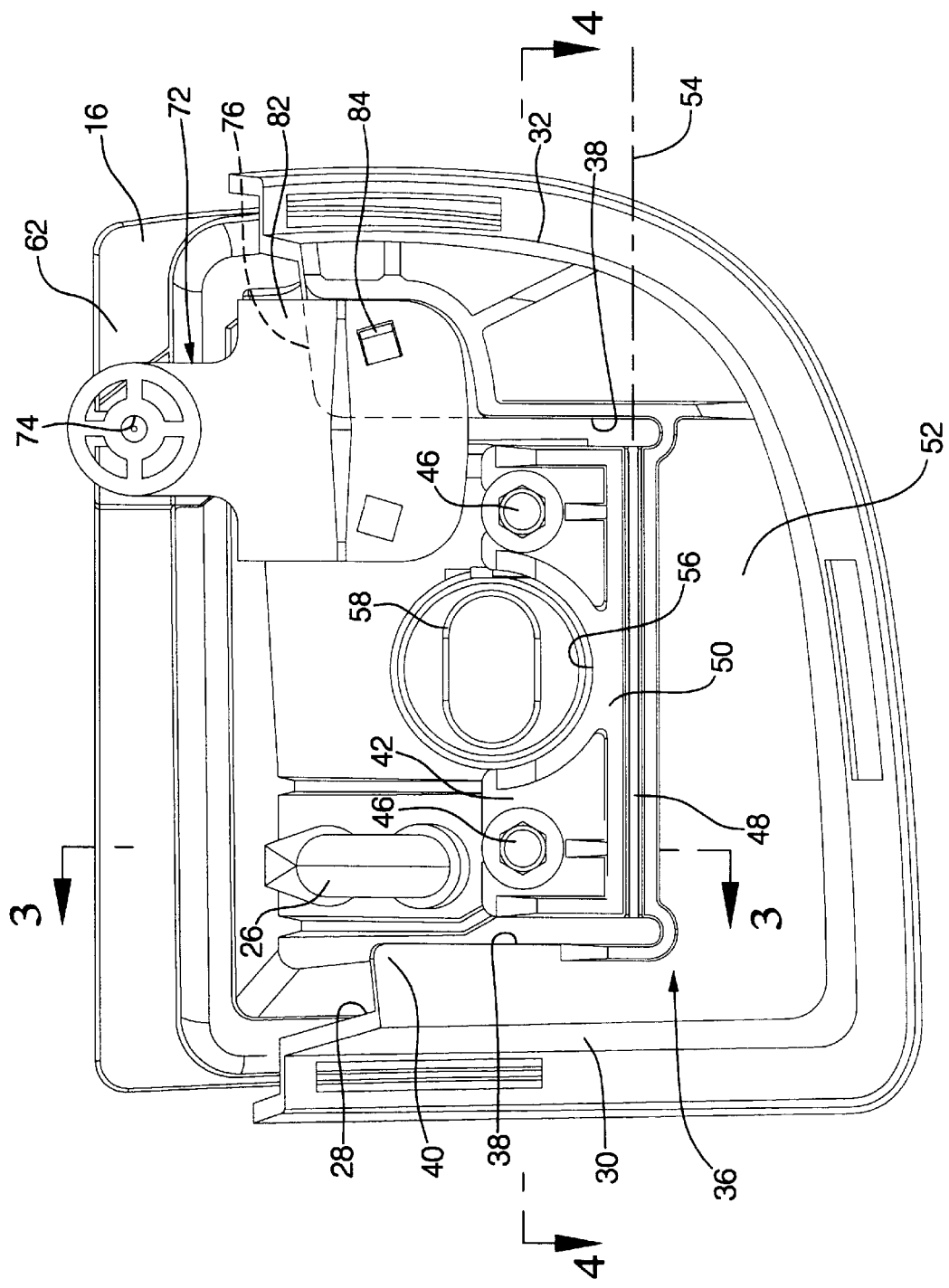
FIG. 2 is a rear view of the system.

The fog lamp 12 is secured to the fascia 14 of the vehicle. In particular, the fog lamp housing 16 is received within a fascia pocket 28 molded in the fascia. The pocket 28 is defined by two approximately vertical side walls 30, 32, a bottom wall 34, and a rear wall 36. As best illustrated in FIG. 2, the rear wall 36 has two parallel, vertical slots 38 extending from the top 40 of the rear wall. A flanged portion 42 extends upwardly from the rear wall between the two vertical slots 38. The flanged portion 42 includes spaced mounting holes 44 for mounting the lamp housing 16 to the flanged portion in the fascia pocket 28 with mounting screws 46.

The rear wall 36 further includes a generally horizontal hinge seam 48 extending between the vertical slots 38 at the base 50 of the flanged portion 42, which distinguishes the flanged portion from the balance of the rear wall, referred to as the fixed portion 52. The hinge seam 48 operates as a flex inducer to allow the flanged portion 42 to slightly flex relative to the fixed portion 52 of the rear wall 36 as shown in FIG. 3. This flexibility provides rotational adjustability of the lamp housing 16 about the axis 54 defined approximately by the hinge seam 48.

The flange portion 42 may include other openings as needed for packaging. As illustrated in FIG. 2, there is a semi-circular cut-out 56 for the socket 58 of the illuminating source 20.

To actuate the rotational adjustability of the fog lamp 12, the integrated lamp and fascia system 10 includes an adjustment means 60 shown in FIG. 1. The adjustment means 60 operates to tilt the vertical aiming angle of the fog lamp 12 either a few degrees up or down. This is accomplished by applying or releasing a fore/aft force to a region 62 of the fog lamp housing 16 at some vertical distance from the hinge seam 48. This moment arm acting about the hinge seam alters the fore/aft distance between the fog lamp 12 and the fixed fascia pocket 28. The fog lamp 12 rotates with the flanged portion 42 to which it is attached, about the hinge seam 48 of the pocket rear wall 36. In the figures, the adjustment means is applied to an upper region 62 of the lamp housing since the hinge seam is located vertically lower in the fascia pocket.

Figure 5:
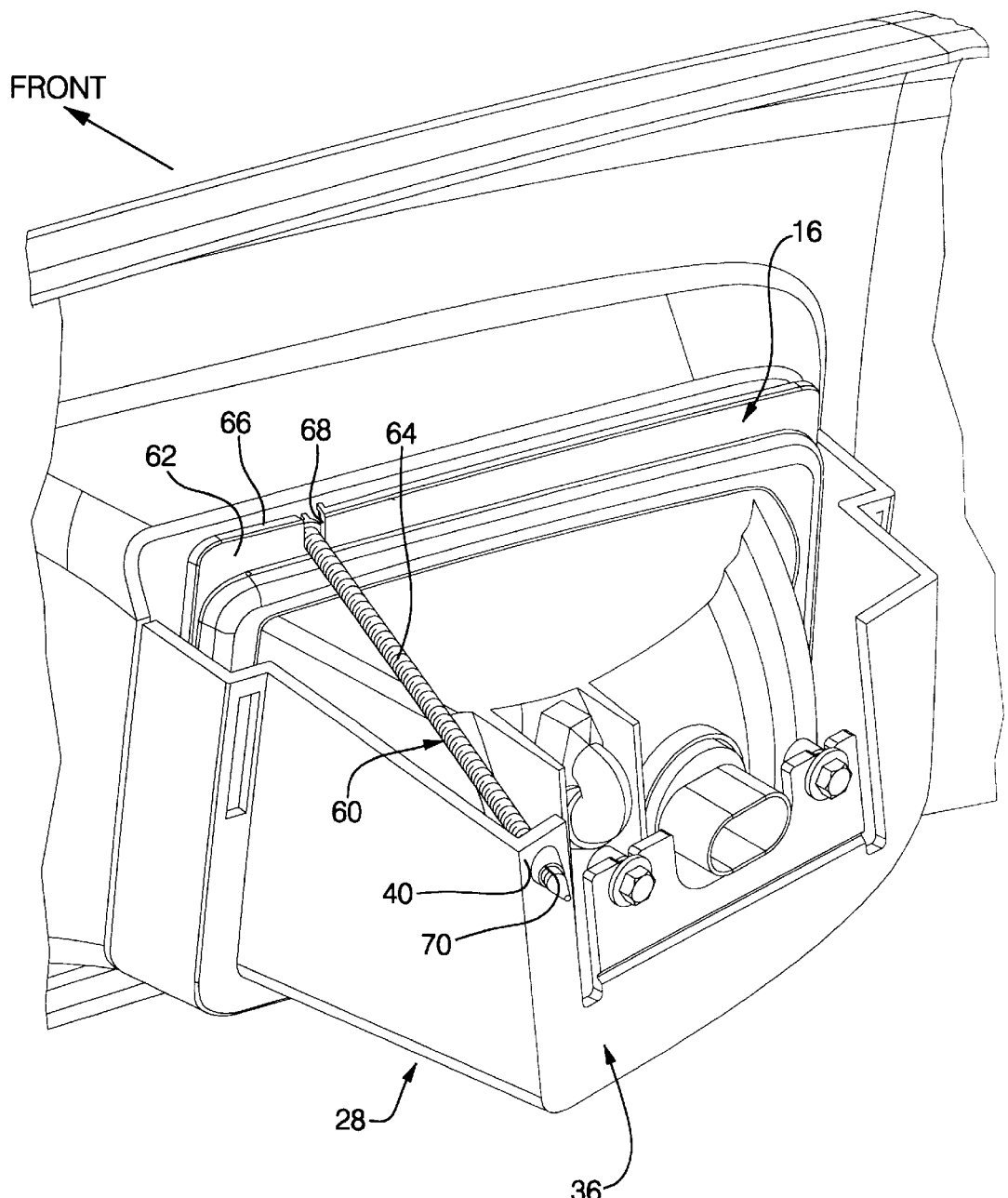
FIG. 5 is a schematic, rear isometric view of a variation of the integrated lamp and fascia system.

The adjustment means 60 illustrated in FIG. 5 is accomplished with an adjustment screw 64 threaded from the accessible, forward surface 66 of the upper region 62 of the lamp housing 16, through a housing upper hole 68 and an upper hole 70 in the top 40 of the rear wall 36 of the fascia pocket 28. Although other adjustment means may be available, an adjustment screw is the most cost-effective.

The invention may be adapted to address fascia molding concerns, which may arise if the fascia pocket rear wall 36 cannot be molded to extend to the height needed to accommodate the adjustment screw 64. As an alternative to the adjustment screw 64 extending through the pocket rear wall 36, an adjustment clip 72 may be fixedly secured to the top 40 of the rear wall and have an opening 74 for the adjustment screw as shown in FIGS. 1 and 2. The adjustment clip 72 operates as an extension of the rear wall. The clip 72 may be described as having an "H" or "h" cross-section with a vertical extension wall 78, a vertical clip wall 82, and a horizontal wall 80 extending horizontally to join vertical walls 78 and 82. The adjustment clip 72 fits over a portion of the rear wall 36, referred to as the mounting portion 76 of the rear wall. The clip horizontal wall 80 seats on top of the mounting portion 76, with each of the clip vertical walls 78, 82 extend parallel and on either side of the mounting portion. The vertical clip wall 82 includes a snap attachment feature 84 to secure the adjustment clip 72 to the rear wall mounting portion 76. The adjustment screw 64 may extend through the vertical extension wall 78 or through both the extension wall and the clip wall 82 as shown in FIG. 1. The screw 64 is of sufficient length rearward of the adjustment clip 72 to allow the fog lamp angle to be varied through a range of vertical angles, without disengaging the clip.

To adjust the vertical angle at which the fog lamp 12 is directed, the adjustment screw 64 is turned slightly thereby increasing or decreasing the fore/aft distance between the lamp housing 16 and the fixed rear pocket wall 52. To raise the aim angle, the adjustment screw 64 is turned clockwise, which pushes the upper region 62 of the lamp housing 16 rearward towards the adjustment clip 72 due to the rotational flexibility provided by the hinge seam 48 along the base of the flange 42. Likewise, to lower the aim angle, the adjustment screw 64 is turned counter-clockwise and the lamp housing 16 is pulled forward and away from the adjustment clip as the lamp housing rotates forward about the hinge seam 48.

The integrated lamp and fascia system provides a secure means of mounting a fog lamp within a protected pocket of the fascia, which minimizes dynamic shake and stability concerns. The vertical aim angle of the fog lamp is easily adjustable by an accessible adjustment means in the front end of the vehicle.

The foregoing description of the preferred embodiment of the invention has been presented for the purpose of illustration and description. It is not intended to be exhaustive, nor is it intended to limit the invention to the precise form disclosed. It will be apparent to those skilled in the art that the disclosed embodiment may be modified in light of the above teachings. The embodiment was chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. An integrated lamp and fascia system for a vehicle, comprising: a lamp including an illuminating source and a lamp housing; a fascia mounted to said vehicle including a fascia pocket defined by two side walls, a bottom wall, and a rear wall, in which said lamp housing is disposed, said rear wall having a fixed portion and a flanged portion operable to rotate about a hinge seam, wherein said lamp housing is mounted to said flanged portion; and an adjustment means operably connected to a region of said lamp housing vertically displaced from said hinge seam and connected to said fixed portion of said pocket rear wall to adjust the fore/aft distance between said region of said lamp housing and said rear wall, which rotates said lamp housing about said hinge seam to adjust a vertical angle of light beam emitted from said lamp.

2. An integrated lamp and fascia system, as defined in claim 1, wherein said flanged portion of said rear wall is defined by said hinge seam and two vertical slots extending from a top of said rear wall and terminating at two ends of said hinge seam.

3. An integrated lamp and fascia system, as defined in claim 1, wherein said adjustment means includes an adjustment screw accessible from a forward surface of said lamp housing and extending through said region of said lamp housing and through said fixed portion of said pocket rear wall, which upon turning said screw rotates said lamp housing about said hinge seam.

4. An integrated lamp and fascia system for a vehicle, comprising:

a lamp including an illuminating source and a lamp housing;

a fascia mounted to said vehicle including a fascia pocket defined by two side walls, a bottom wall, and a rear wall, in which said lamp housing is disposed, said rear wall having a fixed portion, a flanged portion, and a cross car hinge seam about which said flanged portion flexes, said lamp housing mounted to said flanged portion; and an adjustment means including an adjustment clip mounted to said fixed portion of said rear wall to provide a vertical extension thereto, and an adjustment screw accessible from a forward surface of said lamp housing and extending through an upper region of said lamp housing and through said adjustment clip, which by turning said screw either moves said upper region of said lamp housing closer to or further from said pocket rear wall by rotating said lamp housing about said hinge seam to adjust vertical aim of said lamp.

5. An integrated lamp and fascia system, as defined in claim 4, wherein said adjustment clip includes a vertical extension wall forward of and partially overlapping said pocket rear wall through which said adjustment screw extends through, a horizontal wall extending rearward from said extension wall to seat on a top of said pocket rear wall, and a vertical clip wall extending from said horizontal wall, rearward of said pocket rear wall and having a snap attachment feature for securing said adjustment clip to said rear wall.

6. An integrated lamp and fascia system, as defined in claim 5, wherein said flanged portion of said rear wall is defined by said hinge seam and two vertical slots extending from the top of said rear wall and terminating at two ends of said cross car hinge seam.

* * * * *